United States Patent Office 3,767,611
Patented Oct. 23, 1973

3,767,611
HEAT RESISTANT POLYMERS AND REINFORCED
PLASTICS MATERIAL PRODUCED THEREFROM
Brenda Mary Parker, Farnborough, England, assignor to
National Research Development Corporation, London,
England
No Drawing. Filed Feb. 10, 1972, Ser. No. 225,304
Claims priority, application Great Britain, Feb. 19, 1971,
4,968/71, 4,979/71
Int. Cl. C08g 51/08
U.S. Cl. 260—37 R    10 Claims

ABSTRACT OF THE DISCLOSURE

A process of producing a soluble fusible pre-polymer is described in which at least one of toluene and xylene is reacted with p-xylyleneglycol dimethyl ether in the presence of a mild Friedel-Crafts type catalyst so that the toluene and/or xylene react with the p-xylyleneglycol dimethyl ether with the elimination of methanol, the reaction being allowed to proceed almost to the gelation point. The pre-polymers produced are particularly suitable for making carbon fibre reinforced plastics materials.

---

The present invention is concerned with the production of carbon fibre reinforced plastics materials in which the polymer matrix is a thermoset cross-linked polymer.

Many properties of polymers such as hardness, mechanical strength and resistance to chemical attack are greatly dependent upon the extent of polymerisation of the polymer, and many polymers only display desirable properties if their molecular weight is sufficiently h'gh. Generally the attainment of high molecular weight is achieved by cross-linking between linear polymer chains and once a polymer has been cross-linked it is no longer tractable and capable of being manipulated or fabricated.

Throughout this specification the terms "polymer" and "cross-linked polymer" have the meanings given to them in p. 1 and 3 respectively of the 1st edition of "Principles of High Polymer Theory and Plastics" by Schmidt and Marlies.

Frequently even when such highly cross-linked polymers have been produced their strength is not as great as could be desired and in order to obtain a useful material it is necessary to employ the cross-linked polymer as a matrix in a reinforced plastics composite material.

Much effort is being expended in the field of reinforced plastics materials in order to obtain reinforced materials capable of operating at elevated temperatures, say in the region of 250° C. One difficulty that is encountered is that although thermoset plastics are known which have sufficient thermal stability to permit use in the region of 250° C., they are in general too expensive or too inconvenient for normal use.

The general procedure followed in the production of thermally stable reinforced plastics materials is to carry the polymerisation to an intermediate stage in which the product is a soluble fusible pre-polymer, which is a linear polymer with no or relatively few cross-links and then to impregnate the reinforcing materials, fibres or filler, with pre-polymer, either with or without the assistance of a solvent. At this stage the solvent, if any, is removed and the result is a "pre-preg" which may be shaped or moulded before heat, and optionally but generally, pressure are applied to complete the cross-linking reaction and the production of the thermally stable plastics material. The cross-linking reaction is generallyq assisted by a catalyst and may be carried out exclusively by means of functional groups already present in the linear polymer chains or a further component, a cross-linking agent, may be added to provide the links between linear polymer chains. As a general rule when the pre-preg is prepared a short period of heating, known as "pre-cure," is employed in order to cause slight cross-linking so that the pre-preg is convenient to handle, e.g. to remove tackiness. The process in which the plastics material is taken to its fully cross-linked form is termed "curing," although when the plastics material is cured by heating under pressure in a mould it is frequently necessary to continue heating after removal from the mould, to develop the full properties of the reinforced plastics material, and this stage is known as post-cure.

Suitable plastics which have thermal stability capable of producing composite plastics materials capable of operating at elevated temperatures include Friedel-Crafts polymers which are disclosed in U.K. patent specifications Nos. 1,024,222 and 1,094,181, however the broad generality of plastics disclosed in those specifications are not suitable for the production of thermally stable carbon fibre reinforced plastics materials and it is one object of the present invention to indicate suitable plastics from among those broadly disclosed therein.

Although the preferred cross-linked polymers disclosed and claimed in the above-mentioned U.K. patent specifications are based upon aromatic compounds having two or more aromatic rings, either fused or unfused it has been surprisingly found that polymers based upon toluene and xylene in particular have advantages over the other classes of polymers disclosed in U.K. patent specification No. 1,094,181 when used as a matrix material for reinforced plastics material to be used at temperatures in the region of 200–250° C., and polymers based on benzene, diphenyl terphenyl and diphenyl oxide have also advantages.

In accordance wtih the present invention a process for the production of a soluble fusible pre-polymer includes the step of reacting at least one of toluene and xylene with p-xylyleneglycol dimethyl ether in the presence of a first mild Friedel-Crafts type catalyst so that the toluene and/or xylene react with the p-xylyleneglycol dimethyl ether with the elimination of methanol, the said reaction being allowed to proceed until the reaction mixture has almost reached the gelation point.

As is well known Friedel-Crafts type catalysts have different activities and they may be listed in order of decreasing activity as follows:

$$AlCl_3 > FeCl_3 > SnCl_4 > BF_3 > ZnCl_2$$

The term mild Friedel-Crafts type catalyst is used in the present specification to mean a Friedel-Crafts type catalyst having an activity broadly equivalent to that of ferric chloride or less in the above list.

In a preferred process in accordance with the present invention the catalyst is stannic chloride, the catalyst being added dissolved in an organic solvent, for example 1,2-dichloroethane.

By way of contrast with normal Friedel-Crafts reactions where at least substantially molar proportions of catalysts are normally used, in the present processes only minor proportions, less than 10% of catalyst are used and effective results are normally obtained with ½ to 2% by weight of stannic chloride.

The reactants may be present in a wide range of molar ratios although the p-xylyleneglycol dimethyl ether is generally present in molar excess over the organic compound the ratio being generally in the range 1:1 to 6.01 and the optimum ratio may differ depending upon the exact properties sought, but in preferred embodiments the molar ratio of p-xylyleneglycol dimethyl ether and toluene and/or xylene is 1.5:1.

The reaction mixture is heated and maintained at a temperature such that the temperature at a distillation head above the reaction vessel does not exceed 80° C. The amount of methanol evolved gives a measure of the extent to which the reaction has gone and by measuring the quantity of methanol evolved the length of time for which the reaction must be carried out in order to obtain the optimum impregnating resin may be determined. When this stage has been reached the reaction can be stopped by lowering the temperature. The stage at which this is done will vary depending upon the reactants used and the characteristics desired in the soluble fusible prepolymer but in general it is desirable to take the reaction mixture as near to gelation as possible. The reaction is critically dependent upon the temperature and the particular point at which gelation sets in varies as the particular reaction parameters are altered but can be readily determined by simple experiment by those skilled in the art.

The soluble fusible pre-polymers of the present invention are suitable for impregnating reinforcing fillers of powder or fibres particularly carbon fibres to produce a pre-preg.

In accordance with an aspect of the present invention a pre-preg comprises a mat, pad, or layer of reinforcing carbon fibres impregnated with soluble fusible prepolymer together with a second mild Friedel-Crafts catalyst wherein the soluble fusible prepolymer is prepared in a preliminary reaction which includes the step of reacting at least one organic compound selected from toluene, xylene, benzene, diphenyl, terphenyl and diphenyl oxide with p-xylyleneglycol dimethyl ether in the presence of a first mild Friedel-Crafts type catalyst so that the organic compound reacts with the p-xylyleneglycol dimethyl ether with the elimination of methanol, the said reaction being allowed to proceed until the reaction mixture has almost reached the gelation point.

The second mild Friedel-Crafts type catalyst may be catalyst remaining from the initial reaction in which the soluble fusible prepolymer is formed, but advantageously further Friedel-Crafts type catalyst is added at this stage. Preferably the second mild Friedel-Crafts type catalyst is ferric chloride.

The proportion of catalyst added at this stage is advantageously from 0.5 to 5 parts by weight of catalyst per hundred parts by weight of resin (hereinafter designated phr.). Acceptable results may be obtained by use of 0.5 to 1.5 phr. of catalyst but particularly advantageous properties of high temperature stability may be obtained by use of 2.0 to 4.0 phr. of catalyst.

In the present specification the term carbon fibre is used to mean high strength high modulus carbon fibre such as may be obtained by heat treatment of synthetic organic polymers e.g. polyacrylonitrile, according to the processes described in U.K. patent specification No. 1,110,791. Such carbon fibres have an ultimate tensile strength of at least $100 \times 10^3$ p.s.i. and a Young's modulus of at least $20 \times 10^6$ p.s.i. Within this general classification carbon fibres are available as "Type I" which have an ultimate tensile strength in the range 200 to $300 \times 10^3$ p.s.i. and Young's modulus in the range 55 to $65 \times 10^6$ p.s.i. (high modulus fibres) and as "Type II" which have an ultimate tensile strength in the range 350 to $450 \times 10^3$ p.s.i. and Young's modulus in the range 35 to $45 \times 10^6$ p.s.i. (high strength fibres). These carbon fibres are available as continuous tows, in bundles of length approximately one metre, in the form of tape, or cloth, or in the form of felts of short lengths. Carbon fibre in any of these forms is suitable for the practice of the present invention.

Pre-pregs as produced in accordance with the aspect of the invention may be cross-linked to form a reinforced plastics material.

The cross-linking reaction whereby the pre-preg is converted into a reinforced plastics material may be carried out in a heated mould or press in order to produce a desired shape, but this is not essential to the process and even if a mould or press is used, once the reaction has proceeded far enough for the desired shape to be set into the reinforced plastics material it can be removed from the mould or press and the reaction completed in a post-cure stage.

Difficulty may be experienced in removing the reinforced plastics material from a cold mould or press and it is advisable to open the mould or press when hot in order to remove the reinforced plastics material product.

Reinforced composite materials produced by processes in accordance with the present invention show useful strength at room temperature and also useful strength retention at elevated temperatures. In general as the temperature is slowly raised at first no weight loss is observed from a reinforced plastics material, but at a particular temperature, characteristic of the particular reinforced plastics material, weight loss starts. This temperature is known as the trigger temperature and reinforced plastics material in general can only be used for extended periods at a temperature at least 50° C. below its trigger temperature. It will be understood, of course, that for particular uses, e.g. single short term exposures or ablative uses, this temperature may be exceeded.

In the following examples, Examples 1 and 2 illustrate the most advantageous aspect of the present invention namely that employing toluene or xylene as the organic compound while the remaining examples are included to show the same processes using the other starting materials of the invention and to illustrate the particular advantages obtained by selection of toluene and xylene as the organic compound in the practice of the present invention.

The carbon fibre used in the following examples was untreated Type I carbon fibre (high modulus) having an ultimate tensile strengtth of $228 \times 10^3$ p.s.i. and a Young's modulus of $60 \times 10^6$ p.s.i.

EXAMPLE 1

Toluene (231 g. 2.5 moles.) and p-xylyleneglycol dimethyl ether (hereinafter designated DME) (675 g.; 3.75 moles) were mixed together in a closed flask fitted with a thermometer, a stirrer and a distillation head. Stannic chloride, 5 ml. of a 52.5% by weight solution in 1,2-dichloroethane was added and the reaction mixture heated at such a rate as to maintain the temperature at the still head within the range 65° C. (B.P. of methanol) and 80° C.

The reaction was allowed to proceed until approximately 77% of the theoretical amount of methanol had been collected. The entire distillate was assumed to be methanol after allowance had been made for the 1,2-dichloroethane added with the catalyst.

At this stage the resin had a viscosity of 106 poises when measured at 30° C.

Unidirectional pre-preg sheets were prepared by laying the fibres, cut to a convenient length, in a parallel array on a sheet of silicone treated apaper to ensure easy release. A weight of resin equal to the weight of carbon fibre was dissolved in 1,2-dichloroethane and the catalyst solution, in this instance ferric chloride, in methyl ethyl ketone solution, added. The volume of solvent was selected so that all the fibre could be adequately wetted without excess.

The amount of ferric chloride catalyst added was 1.1 parts by weight per hundred parts by weight of resin (hereinafter designated phr.) and after air drying for an hour at room temperature and pre-curing at 150° C. for 10 minutes the pre-preg was conveniently handleable.

The pre-preg was cut into 200 mm. lengths and a quantity sufficient to make a bar 200 mm. x 12 mm. x 2 mm. weighed into an open-ended trough mould. The exact quantity, which is between 6 and 7 g., is dependent upon the fibre content of the pre-preg and can be determined readily by simple experimentation.

The mould was placed in a heated press and allowed to reach a temperature of 170–180° C. before a pressure of 200 p.s.i. was applied and maintained for 1 hour at the end of which time the mould was opened and the bar immediately removed. This must be done carefully since the bar may still be flexible after this time of cure at this temperature. Bars were then divided into three groups and given no post cure, post cure for 24 hours at 200° C. and post cure for 24 hours at 200° C. followed by 16 hours at 250° C.

The composites produced by the different post cure schedules had the following flexural strengths:

|  | Test at 20° C., p.s.i. | Test at 250° C., p.s.i. |
|---|---|---|
| No post cure | 61.3×10³ | 18.1×10³ |
| Post cure, 24 hours, 200° C | 73.0×10³ | 41.2×10³ |
| Post cure, 24 hours, 200° C., plus 16 hours, 250°C | 72.5×10³ | 44.5×10³ |

This composite had a trigger temperature of 310° C.

EXAMPLE 2

The procedure of Example 1 was repeated using xylene (307.5 g.; 2.9 moles), DME (747 g.; 4.5 moles) and 5.2 ml. of a 43% by weight solution of stannic chloride in 1,2-dichloroethane as catalyst. The reaction was allowed to proceed until 74% of the theoretical amount of methanol had been collected. At this stage the resin had a viscosity of 3,360 poises at 30° C.

Unidirectional pre-preg sheets were prepared as described in Example 1 using 0.7 phr. of ferric chloride catalyst and after post cure had the flexural strengths listed below:

|  | Test at 20° C., p.s.i. | Test at 250° C. |
|---|---|---|
| No post cure | 49.3×10³ |  |
| Post cure, 24 hours, 200° C | 66.6×10³ | 11.2 |
| Post cure 24 hours, 200° C., plus 16 hours, 250° C | 63.3×10³ | 17.1 |

This composite had a trigger temperature of 220° C. with no post cure, of 300° C. after post cure at 200° C. for 24 hours and 340° C. after post cure at 200° C. for 24 hours and at 250° C. for 16 hours.

EXAMPLE 3

The procedure of Example 2 was repeated except that the amount of ferric chloride catalyst added at the pre-preg stage was 3.1 phr. and the resulting composite materials had the following flexural strengths:

|  | Test at 20° C., p.s.i. | Test at 250° C., p.s.i. |
|---|---|---|
| No post cure | 63.1×10³ | 32.5×10³ |
| Post cure, 24 hours, 200° C | 60.6×10³ | 40.2×10³ |
| Post cure 24 hours, 200° C., plus 16 hours, 250° C | 73.1×10³ | 48.3×10³ |

This composite had a trigger temperature of 210° C. with no post cure, of 315° C. after post cure at 200° C. for 24 hours, and 355° C. after post cure, at 200° C. for 24 hours and at 250° C. for 16 hours.

EXAMPLE 4

The procedure of Example 1 was repeated using benzene (78 g.; 1 mole) DME (250 g.; 1.5 moles) and 4 ml. of a 7% by weight solution of stannic chloride in 1,2-dichloroethane. The reaction was allowed to proceed until approximately 70% of the theoretical amount of methanol had been collected. This could not be done accurately because of the tendency of benzene (B.P. 80° C.) to co-distil with the methanol. At this stage the resin had a viscosity of 1 poise when measured at 30° C.

Unidirectional pre-pregs were prepared as described above using 1.8 phr. of ferric chloride and the resulting composite bars had the following flexural strengths:

|  | Test at 20° C., p.s.i. | Test at 250° C., p.s.i. |
|---|---|---|
| No post cure | 68.2×10³ | 23.8×10³ |
| Post cure, 24 hours, 200° C | 66.9×10³ | 40.9×10³ |
| Post cure, 24 hours, 200° C., plus 16 hours, 250° C | 60.1×10³ | 44.5×10³ |

These composites had a trigger temperature of 240° C. when determined as hereinabove defined.

EXAMPLE 5

The procedure of Example 1 was repeated using diphenyl (309 g.; 2.0 moles) DME (501 g.; 3.0 moles) and 5 ml. of a 43.5% by weight solution of stannic chloride in 1,2-dichloroethane as catalysts. The reaction was allowed to proceed until 62% of the theoretical amount of methanol had been collected. At this stage the resin had a viscosity of 11,000 poises at 30° C.

Unidirectional pre-preg sheets were prepared as described in Example 1 using 0.5 phr. of ferric chloride catalyst and after post cure had the strengths listed below:

|  | Test at 20° C., p.s.i. | Test at 250° C., p.s.i. |
|---|---|---|
| No Post cure | 67.3×10³ | 3.1×10³ |
| Post cure, 24 hours, 200° C | 73.4×10³ | 7.5×10³ |
| Post cure, 24 hours, 200° C., plus 16 hours, 250° C | 71.5×10³ | 9.2×10³ |

This composite had a trigger temperature of 340° C. after post cure for 24 hours at 200° C. and 16 hours at 250° C.

EXAMPLE 6

The procedure of Example 1 was repeated using terphenyl (466 g.; 2.03 moles), DME (501 g.; 3.0 moles) and 5.4 ml. of a 47% by weight solution of stannic chloride in 1,2-dichloroethane as catalyst. The reaction was allowed to proceed until 55% of the theoretical amount of methanol had been collected. At this stage the resin had a viscosity of 3,420 poises at 30° C.

Unidirectional pre-preg sheets were prepared as described in Example 1 using 0.7 phr. of ferric chloride catalyst and after post cure had the flexural strengths listed below:

|  | Test at 20° C., p.s.i. | Test at 250° C., p.s.i. |
|---|---|---|
| No Post cure | 57.9×10³ | 1.2×10³ |
| Post cure, 24 hours, 200° C | 67.3×10³ | 3.9×10³ |
| Post cure, 24 hours, 200° C., plus 16 hours, 250° C | 70.4×10³ | 10.0×10³ |

This composite had a trigger temperature of 360° C. after post cure for 24 hours at 200° C. and 16 hours at 250° C.

EXAMPLE 7

The procedure of Example 6 was repeated with 6.0 moles of DME and using 0.6 phr. of ferric chloride catalyst at the pre-preg stage. The composites had the following flexural strengths:

|  | Test at 20° C., p.s.i. | Test at 250° C., p.s.i. |
|---|---|---|
| No post cure | 63.1×10³ | 2.1×10³ |
| Post cure, 24 hours 200° C | 69.1×10³ | 18.8×10³ |
| Post cure, 24 hours, 200° C., plus 16 hours, 250° C | 74.7×10³ | 30.5×10³ |

This composite had a trigger temperature of 310° C. after post cure at 200° C. for 200 hours and 250° C. for 16 hours.

EXAMPLE 8

A proprietary Mark II Friedel-Crafts resin based upon diphenyl oxide and having a viscosity at 30° C. of 331 poises was used to prepare unidirectional pre-pregs as described in Example 1 using 0.5 phr. of ferric chloride catalyst. The particular resin used was "Caldura" sold by AEI Ltd. After post cure these composites had the following flexural strengths:

|  | Test at 20° C., p.s.i. | Test at 250° C., p.s.i. |
|---|---|---|
| No post cure | 73.9×10³ | 1.7×10¹ |
| Post cure, 24 hours, 200° C | 78.3×10³ | 4.2×10³ |
| Post cure, 24 hours, 200° C., plus 16 hours, 250° C. | 81.1×10³ | 6.3×10³ |

This composite had a trigger temperature of 380° C. after post cure for 24 hours at 200° C. and 16 hours at 250° C.

EXAMPLE 9

The procedure of Example 8 was repeated except that the proportion of catalyst used at the pre-preg stage was 2.1 phr. of ferric chloride. After post cure the composites had the following flexural strengths:

|  | Test at 20° C., p.s.i. | Test at 250° C., p.s.i. |
|---|---|---|
| No post cure | 72.0×10³ | 35.8×10³ |
| Post cure, 40 hours, 200° C | 69.3×10³ | 43.1×10³ |

This composite had a trigger temperature of 370° C. after post cure for 40 hours at 200° C.

It will be realised that the decomposition temperature, that is trigger temperature as hereinbefore defined, is not the only criteria by which reinforced plastics materials are selected for use at elevated temperature. For example, the fibre efficiency i.e. the ratio of the strength of the fibre to that of the reinforced plastics material taking into account the proportion of fibre present, and also the extent to which properties are retained at elevated temperatures.

The following table sets forth relevant properties of reinforced plastics materials prepared as described herein and the following discussion assesses the significance of the data.

TABLE

| Resin precursor | Post-cure | Trigger temp. (° C.) | Fibre content (percent v./v.) | Effective fibre strength | | Fibre efficiency, percent | Composite strength retention at 250° C., percent |
|---|---|---|---|---|---|---|---|
| | | | | 20° C. | 250° C. | | |
| Toluene (Ex. 1) | A | | 44.5±4.3 | 950 | 280 | 59 | 29 |
| | B | | | 1,131 | 638 | 70 | 56 |
| | C | 310 | | 1,123 | 689 | 70 | 61 |
| Xylene (A) (Ex. 2) | A | 220 | 43.0±1.7 | 790 | | 50 | |
| | B | 300 | | 1,062 | 180 | 65 | 17 |
| | C | 340 | | 1,020 | 274 | 64 | 27 |
| Xylene (B) (Ex. 3) | A | 260 | 41.5 | 1,040 | 540 | 68 | 52 |
| | B | 315 | 42.3 | 985 | 653 | 64 | 66 |
| | C | 355 | | 1,195 | 785 | 78 | 66 |
| Benzene (Ex. 4) | A | | 48.8±2.2 | 964 | 337 | 60 | 35 |
| | B | | | 946 | 578 | 59 | 61 |
| | C | 240 | | 853 | 751 | 59 | 76 |
| Diphenyl (Ex. 5) | A | | 41.0±2.9 | 1,130 | 53 | 74 | 5 |
| | B | | | 1,235 | 126 | 81 | 10 |
| | C | 340 | | 1,200 | 154 | 79 | 13 |
| Terphenyl (A) (Ex. 6) | A | | 46.7±2.3 | 850 | 18 | 56 | 2 |
| | B | | | 992 | 58 | 65 | 6 |
| | C | 360 | | 1,040 | 140 | 68 | 14 |
| Terphenyl (B) (Ex. 7) | A | | 49.0±1.6 | 888 | 30 | 58 | 3 |
| | B | | | 972 | 265 | 64 | 27 |
| | C | 310 | | 1,051 | 429 | 69 | 41 |
| Diphenyl oxide (A) (Ex. 8) | A | | 43.0±1.8 | 1,270 | 29 | 83 | 2 |
| | B | | 40.0 | 1,265 | 62 | 83 | 5 |
| | C | 380 | | 1,300 | 101 | 85 | 8 |
| Diphenyl oxide (B) (Ex. 9) | A | | 44.8±3.0 | 1,110 | 550 | 73 | 50 |
| | D | 370 | | 1,065 | 663 | 70 | 62 |

NOTES:
1. The strength figures in the above table are given in MNm.⁻² and the conversion factor is Nm.⁻²=6,895 × p.s.i.
2. The postcure schedules were as follows:
   A—No post-cure.
   B—24 hours at 200° C.
   C—24 hours at 200° C. and 16 hours at 250° C.
   D—40 hours at 200° C.
3. The trigger temperature has been previously defined.
4. The fibre content was determined by burning off the resin in a muffle furnace at 500° C. At this temperature weight loss from carbon fibre is negligible. The fibre content by volume was calculated from the weight content, taking the fibre specific gravity as 2.0 and the resin specific gravity as 1.2. The variance is given where five or more measurements were made.
5. The strength of the reinforced plastics materials was measured in flexure in a three point bend test over a span of 50 mm. (2 inches) given a span/depth ratio of about 25:1.
6. Effective strength is the flexural strength divided by the fibre content.
7. Fibre efficiency is the effective fibre strength in the reinforced plastics composite strength expressed as a percentage of the fibre tensile strength.
8. Composite strength retention is the effective fibre strength at 250° C. expressed as a percentage of the effective fibre strength at 20° C.

Except for the resins having benzene, xylene (B) or diphenyl oxide (B) as precursor the amount of catalyst added at the pre-preg stage was about 1 phr. or less. The resin having benzene as a precursor had a trigger temperature of 240° C. but the remainder all have a trigger temperature in excess of 300° C. after post cure. The fibre efficiency of these composites after post cure is in the region of 70% with exception of the resin with xylene (A) as precursor. Only the composites from toluene and, to a lesser extent, terphenyl (B) as precursors showed reasonable retention of strength at 250° C.

The use of an increased proportion of ferric chloride catalyst at the pre-preg stage, xylene (B)—3 phr. and diphenyl oxide (B)—2 phr. resulted in composites with a strength retention at 250° C. comparable with that for resins from toluene as precursor. The fibre efficiency of the xylene (B) composite was increased with respect to the xylene (A) composite by the greater proportion of catalyst, but the reverse is true of the diphenyl oxide (B) resin.

Since the desire is to obtain a composite with the highest trigger temperature compatible with the highest fibre efficiency and highest strength retention at 250° C. the best resin, and compositions, are those using toluene as precursor.

What I claim is:
1. A pre-preg which is a mat, pad or layer of reinforcing carbon fibre impregnated with soluble fusible pre-polymer together with up to 5 parts by weight of a second Friedel-Crafts type catalyst having an activity equivalent to or less than that of ferric chloride in the list

$$AlCl_3 > FeCl_3 > SnCl_4 > BF_3 > ZnCl_2$$

in decreasing order of activity per hundred parts by weight of soluble fusible pre-polymer wherein the soluble fusible pre-polymer is prepared in a preliminary reaction which includes the step of reacting at least one organic compound selected from the group consisting of toluene, xylene, and benzene, with p-xylyleneglycol dimethyl ether in a molar ratio of ether to organic compound in the range 1:1 to 6:1 in the presence of up to 10% by weight of a first Friedel-Crafts type catalyst having an activity equivalent to or less than that of ferric chloride in the list $AlCl_3 > FeCl_3 > SnCl_4 > BF_3 > ZnCl_2$ in decreasing order of activity, so that the organic compound reacts with the p-xylyleneglycol dimethyl ether with the elimination of methanol, the preliminary reaction being allowed to proceed until the reaction mixture has almost reached the gelation point.

2. A pre-preg as claimed in claim 1 wherein the second Friedel-Crafts type catalyst has an activity equivalent to stannic chloride.

3. A pre-preg as claimed in claim 1 wherein the first Friedel-Crafts type catalyst has an activity equivalent to ferric chloride.

4. A pre-preg as claimed in claim 1 wherein the first Friedel-Crafts type catalyst in the preliminary reaction is stannic chloride and is present in a proportion within the range 0.5 to 2% by weight.

5. A pre-preg as claimed in claim 1 wherein the second Friedel-Crafts type catalyst is ferric chloride and is present in a proportion within the range 0.5 to 5 parts by weight of catalyst per hundred parts by weight of resin.

6. A pre-preg as claimed in claim 1 wherein the organic compound is selected from toluene and xylene and the molar ratio of p-xylyleneglycol dimethyl ether to organic compound is 1.5:1.

7. A reinforced plastics material obtained by cure of the pre-preg claimed in claim 1.

8. A pre-preg as claimed in claim 1 wherein said first Friedel-Crafts catalyst is selected from the group consisting of $FeCl_3$, $SnCl_4$, $BF_3$ and $ZnCl_2$.

9. A pre-preg as claimed in claim 1 wherein said second Friedel-Crafts catalyst is selected from the group consisting of $FeCl_3$, $SnCl_4$, $BF_3$ and $ZnCl_2$.

10. A pre-preg which is a mat, pad or layer of reinforcing carbon fibre impregnated with soluble fusible prepolymer together with 0.5 to 5 parts by weight of ferric chloride as catalyst per hundred parts by weight of soluble fusible prepolymer, wherein the soluble fusible prepolymer is prepared in a preliminary reaction which includes the step of reacting an organic compound selected from the group consisting of toluene and xylene with p-xylyleneglycol dimethyl ether in a molar ratio of ether to organic compound of 1.5 to 1 in the presence of 0.5 to 2% by weight of stannic chloride as catalyst with the elimination of methanol, the preliminary reaction being allowed to proceed until the reaction mixture has almost reached the gelation point.

References Cited
UNITED STATES PATENTS 3,338,844    8/1967    Harris et al. _____ 260—2 R

FOREIGN PATENTS 1,094,181    12/1967    Great Britain _____ 260—47 R
1,110,791    4/1968    Great Britain _____ 260—47 R
1,102,575    2/1968    Great Britain _____ 260—2 R LEWIS T. JACOBS, Primary Examiner U.S. Cl. X.R.

117—161 R; 260—41 R